United States Patent [19]

Bradfield

[11] Patent Number: 5,091,284
[45] Date of Patent: Feb. 25, 1992

[54] MARKING FLUOROCARBON SURFACES

[75] Inventor: Malcolm G. Bradfield, Leigh, England

[73] Assignee: BICC Public Limited Company, London, England

[21] Appl. No.: 268,732

[22] Filed: Nov. 8, 1988

[30] Foreign Application Priority Data

Nov. 12, 1987 [GB] United Kingdom ............... 8726482

[51] Int. Cl.$^5$ ........................... G03C 5/16; G03F 7/26
[52] U.S. Cl. .................................... 430/292; 430/945; 219/121.68
[58] Field of Search .................. 219/121.68; 430/945, 430/292

[56] References Cited

U.S. PATENT DOCUMENTS

| | | | |
|---|---|---|---|
| 4,652,528 | 3/1987 | Domkowski | 428/422 X |
| 4,808,966 | 2/1989 | Ferlier | 219/121.68 |

OTHER PUBLICATIONS

"Method For Reducing Laser Intensity Attenuation Due to Debris From Etch Products", *IBM Technical Disclosure Bulletin*, vol. 28, No. 5, Oct. 1985, p. 2143.

*Primary Examiner*—Cynthia Hamilton
*Attorney, Agent, or Firm*—Oliff & Berridge

[57] ABSTRACT

Most fluorocarbon polymer surfaces (especially PTFE and FEP) have hitherto been considered unsuitable for marking by laser printing, which would have obvious attractions for marking such materials in high performance electric cables. It has now been found that such surfaces can be made receptive for laser printed markings. A reflective surface is first formed, preferably by incorporating white pigment into a fluorocarbon base, and a light-transmitting (preferably translucent) ETFE pr ECTFE layer is applied over it. When the reflective layer is based on PTFE or FEP, a primer layer formed from a mixed dispersion of PTFE or FEP and ETFE or ECTPE (as appropriate) is preferably applied before the underlying PTFE or FEP composition is sintered.

14 Claims, 2 Drawing Sheets

MARKING FLUOROCARBON SURFACES

This invention relates to a method of marking fluorocarbon surfaces of high-performance electric cables and other articles, and to the products of the method.

The insulated conductors (and sometimes composite cores or complete multiconductor cables) need to be marked for the purpose of identifying conductors and circuits, designating cable types, recording the supplier and/or date of manufacture, or for other purposes. Laser printing (which is used for some other cables) is attractive on account of operating without inks or pigment, without physical contact and at high speed; but it has hitherto been found unworkable when the surface to be marked was of fluorinated ethylene propylene copolymer (FEP) or polytetrafluoroethylene (PTFE): a large proportion of the incident radiation appeared to be reflected and/or diffused, and no clearly visible mark could be obtained, except perhaps at unacceptably high intensities.

In accordance with the present invention, the surface to be coated is either formed of or coated with a reflective fluorocarbon polymer composition; a light-transmitting fluorocarbon polymer composition comprising an ethylene/tetrafluoroethylene copolymer or an ethylene/chlorotrifluoroethylene copolymer is applied as a surface coating over the surface of the reflective composition; and the coated surface is then marked by laser printing.

The reflective fluorocarbon surface is preferably a white pigmented one, more especially one made white by conventional amounts of titanium dioxide pigment. If required however, colored reflective surfaces can be used, though pastel shades are naturally more satisfactory as background for dark indicia.

By a "light-transmitting" composition is meant one that is translucent or transparent to the extent that at least 20% of incident radiation of appropriate wavelength (eg about 1000nm if an infra-red laser is to be used) will penetrate the thickness of the surface coating, with or without being scattered, to be reflected by the underlying reflective surface.

Surprisingly, the presence of a substantially transparent coating one of the specified copolymers, which might have been expected to make no difference to the result, allows legible markings to be produced with both infra-red and ultra-violet lasers. Better results are however obtained when the coating is translucent so that a significant fraction of the incident light (say 10-50%) is scattered at least once within the light-transmitting layer: this results in markings with significantly sharper edges. Optimum translucency appears to be that achievable by incorporation into the copolymer of about 5-6% by weight of a titanium dioxide pigment of mean particle size 0.8nm.

When, as is preferred, ethylene-tetrafluoro ethylene copolymer (ETFE) as the light transmitting coating and is applied directly to an underlying reflective surface of polytetrafluoroethylene (PTFE) or of fluorinated ethylene/propylene copolymer (FEP), adhesion is not satisfactory, but we have found that this difficulty can be overcome by applying a primer coating of mixed ETFE/PTFE or ETFE/FEP as appropriate in dispersion form before the PTFE is sintered; suitable mixtures comprise between 0.1 and 1 parts by weight of ETFE for each part of PTFE or FEP. Alternatively, a suitable mixture of polymers can be used to form the light-transmitting outer layer, but this may produce markings less legible than can be achieved with a layer in which ETFE or ECTFE is the sole polymer. Satisfactory adhesion could also be obtained by etching the pigmented surface (e.g. with a solution of sodium in liquid ammonia), but this is not recommended for products in which the marked surface will be subject to significant electrical stress.

EXAMPLE 1

A 19 ×0.20mm nickel-plated copper wire strand was coated with a white PTFE composition comprising 0.5% titanium dioxide pigment by a convention extrusion process to form a dielectric of radial thickness 0.25mm. comprising only 1 part dispersion grade ETFE and 5 parts dispersion grade PTFE was applied to form a mixed fluorocarbon primer coating about 0.005mm thick.

The primed insulated wire was then dried and heated to 375-400° C. for half a minute to sinter both the dielectric and the primer. Next a translucent coating 0.02mm thick was applied by dipping six times in a 35% total solids aqueous dispersion of ETFE with 5% titanium dioxide pigment of mean particle size 0.8nm, each coat being dried and fused at 300° C. for half a minute. The resulting coated wire was then laser printed using a 1064nm wavelength YAG laser at nominal beam power of 7W, which formed clearly visible lettering without detriment to electrical properties.

It was noted that the coated wire was also receptive of ink jet markings, making it suitable for use also when colored markings are needed.

EXAMPLE 2

A 19 ×0.20mm nickel plated copper wire strand was lapped with two "Kapton 616" tapes ("Kapton" is a trademark) each comprising a polyimide film 0.025mm thick coated on each side with 0.0025mm of FEP, applied each with 50% overlap and with opposite hand to form a layer with a radial thickness of 0.12mm. A white coating with a radial thickness of 0.025mm thick was applied to the surface of the tape layer from a 35% total-solids PTFE dispersion containing 12% of the same titanium dioxide pigment. A translucent coating was applied and printed exactly as in Example 1.

EXAMPLE 3

This was the same as example 2 except that the dispersion used to form the white coating was based on FEP instead of PTFE, the total solids content being 35% as before.

EXAMPLE 4

Another 19 ×0.20mm nickel plated copper wire strand was lapped with a single Kapton 616 tape applied with 75% overlap and then a white pigmented PTFE tape 0.051mm thick applied with 50% overlap. The PTFE tape was primed with a single application of a 35%-solids mixed dispersion containing equal weights of PTFE and FEP, each of dispersion grade, and the tape and coating sintered simultaneously by heating for 30 seconds at about 375-400° C. After sintering (during which significant shrinkage of the PTFE tape occurs) the radial thickness of the coated tape layer was 0.18mm. A translucent coating was applied and printed exactly as in Example 1.

EXAMPLE 5

Two 19 ×0.20mm nickel plated copper wire strands were each lapped with a Kapton 616 tape applied with 50% overlap and then with a pigmented PTFE tape 0.051mm thick applied with 50% overlap. The pigmented tapes were respectively red and blue. After sintering (as in Example 4) the tape layers had a radial thickness of 0.12mm. The red and blue covered strands were twisted together to form a pair. This was lapped with a single Kapton 616 tape applied with 50% overlap. This was coated with white FEP, and primed with a 16% solids mixed aqueous dispersion comprising only 1 part dispersion grade ETFE and 5 parts dispersion grade FEP. After sintering, a translucent coating was applied exactly as in Example 4, and was easily printed as in the other examples despite its twisted non-circular shape.

EXAMPLE 6

This was exactly the same as Example 3, except that the translucent layer was based on ECTFE instead of ETFE.

BRIEF DESCRIPTION OF THE DRAWINGS

Each figure of the accompanying drawings is a cutaway diagram of the cable in accordance with the corresponding numbered Example.

DETAILED DESCRIPTION OF THE DRAWINGS

Figure 1:
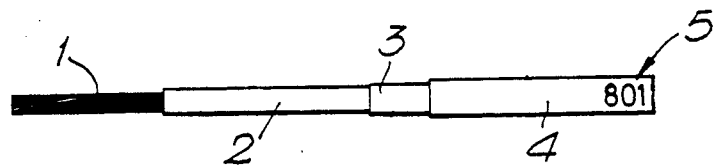

In FIG. 1, reference number 1 designates the nickel-plated copper conductor, 2 the dielectric of white PTFE, 3 the primer coat, 4 the translucent ETFE coating and 5 the indicia formed by laser marking.

Figure 2:
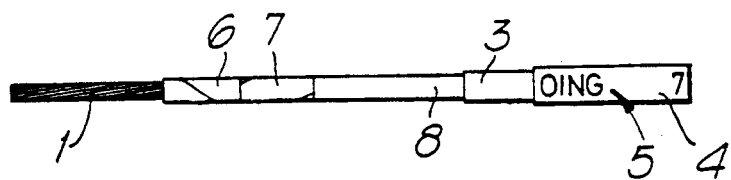
Figure 3:
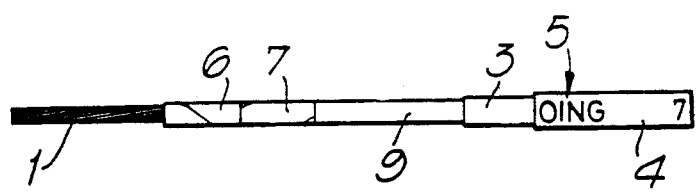
Figure 4:
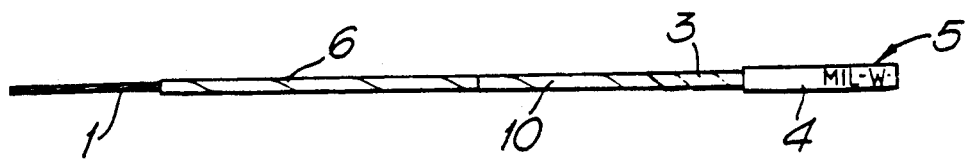
Figure 5:
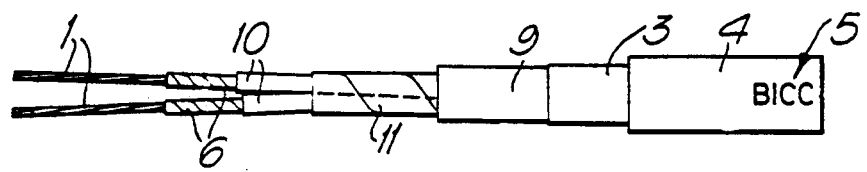
Figure 6:
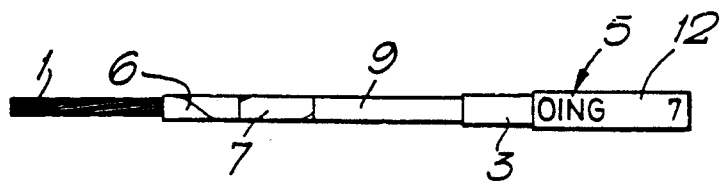

In the other figures, the numerals from 1 thru 5 have the same significance; Kapton insulating tapes are shown at 6 and 7, white coatings of PTFE and FEP at 8 and 9 respectively (FIGS. 2 -3). PTFE tapes are shown at 10 (FIGS. 4 -5) and a Kapton binder tape at 11 (FIG. 5); reference 12 (FIG. 6) shows a translucent coating of ECTFE.

What I claim as my invention is:

1. A method of marking a fluorocarbon body having a surface of a reflective fluorocarbon polymer composition comprising applying a light-transmitting ethylene-tetrafluoro ethylene copolymer composition as a surface coating over said surface of said reflective composition, and marking said coated surface by laser printing.

2. A method as claimed in claim 1 in which said reflective fluorocarbon polymer composition is a white pigmented one.

3. A method as claimed in claim 1 in which said light-transmitting composition is translucent and 10–50% of incident radiation is scattered at least once within the light-transmitting layer.

4. A method as claimed in claim 1 in which said light-transmitting fluorocarbon polymer has the same translucency as a composition consisting of ethylene/tetrafluoroethylene copolymer and 5–6% by weight of titanium dioxide pigment of mean particle size 0.8mm.

5. A method of marking fluorocarbon body with a surface of a reflective fluorocarbon polymer composition comprising applying a light-transmitting ethylene/-chlorotrifluoroethylene polymer composition as a surface coating over said surface of said reflective composition, and marking said coated surface by laser printing.

6. A method of marking a fluorocarbon body with a surface on a reflective fluorocarbon polymer composition, comprising:
   applying a light transmitting ethylene tetrafluoroethylene copolymer composition as a surface coating over said surface of reflective composition, and
   forming, by laser printing on said coated surface, dark indicia visible against said reflective surface as background.

7. A method as claimed in claim 6 in which said reflective fluorocarbon polymer composition is a white pigmented composition.

8. A method as claimed in claim 6 in which said light transmitting composition is translucent and 10 and 50% of incident radiation is scattered at least once within the light transmitting layer.

9. A method as claimed in claim 6 in which said light transmitting fluorocarbon polymer has the same translucency as a composition consisting of ethylene/tetrafluoroethylene copolymer and 5 to 6% by weight of titanium dioxide pigment of mean particle size 0.88mm.

10. A method as claimed in claim 1 in which said reflective fluorocarbon polymer composition comprises sintered polytetrafluoroethylene obtained by the preliminary steps of first forming a reflective surface of polytetrafluoroethylene in an unsintered condition, second applying a primer coating of mixed ethylene/teterfluoroethylene copolymer and polyteterafluoroethylene in dispersion form and third sintering said polytetrafluoroethylene in said reflective surface and both said ethylene/tetra-fluoro-ethylene copolymer and said polytetrafluoroethylene in said primer coating.

11. A method as claimed in claim 1 in which said reflective fluorocarbon polymer composition comprises sintered fluorinated ethylene/propylene copolymer comprising the preliminary steps of first forming a reflective surface of polytetrafluoroethylene polymer in an unsintered condition, second applying a primer coating of mixed ethylene/tetrafluoroethylene copolymer and fluorinated ethylene/propylene copolymer in dispersion form and third sintering said polytetrafluoroethylene in said reflective surface and both said ethylene/-tetrafluorethylene copolymer and said fluorinated ethylene/propylene copolymer in said primer coating.

12. A method as claimed in claim 6 in which said reflective fluorocarbon polymer composition comprises sintered polytetrafluoroethylene obtained by the preliminary steps of first forming a reflective surface of polytetrafluoroethylene in an unsintered condition, second applying a primer coating of mixed ethylene/tetrafluoroethylene copolymer and polytetrafluoroethylene in dispersion form and third sintering said polytetrafluorothylene in said reflective surface and both said ethylene/tetrafluoroethylene copolymer and said polytetrafluoroethylene in said primer coating.

13. A method as claimed in claim 6 in which said reflective fluorocarbon polymer composition comprises sintered fluorinated ethylene/propylene copolymer comprising the preliminary steps of first forming a reflective surface of polytetrafluoroethylene polymer in an unsintered condition, second applying a primer coating of mixed ethylene/tetrafluoroethylene copolymer and fluorinated ethylene/propylene copolymer in dispersion form and third sintering the said polytetrafluoro-ethylene in said reflective surface and both said ethylene/tetrafluoroethylene copolymer and said fluorinated ethylene/propylene copolymer in said primer coating.

14. A method of marking a fluorocarbon body with a surface of a reflective fluorocarbon polymer composition comprising applying a light transmitting ethylene/chlorotrifluoroethylene polymer composition as a surface coating over said surface of said reflective composition, and forming, by laser printing on said coated surface, dark indicia visible against said reflective surface as background.

* * * * *